United States Patent

Sato et al.

[11] Patent Number: 5,677,076
[45] Date of Patent: Oct. 14, 1997

[54] SAFETY DEVICE FOR ENCLOSED CELL

[75] Inventors: Yuzo Sato; Fumiyoshi Kudo, both of Saku, Japan

[73] Assignee: TDK Corporation, Tokyo, Japan

[21] Appl. No.: 686,232

[22] Filed: Jul. 23, 1996

[30] Foreign Application Priority Data

Aug. 1, 1995 [JP] Japan ................... 7-213930

[51] Int. Cl.$^6$ .................................................. H01M 2/12
[52] U.S. Cl. .................. 429/56; 429/164; 429/175; 429/58
[58] Field of Search .......................... 429/164, 165, 429/175, 56, 58, 61, 66, 64

[56] References Cited

U.S. PATENT DOCUMENTS

| Re. 23,427 | 10/1951 | Ruben | 429/165 |
| 4,174,166 | 11/1979 | Rosansky | 429/56 |
| 4,601,959 | 7/1986 | Romero | 429/56 |
| 4,698,282 | 10/1987 | Mantello | 429/53 |
| 4,971,867 | 11/1990 | Watanabe et al. | 429/61 |

FOREIGN PATENT DOCUMENTS 8-115715  7/1996  Japan.

OTHER PUBLICATIONS

Ubakawa, "Patent Abstracts of Japan", vol. 18, No. 540, E-1616, abstract 6-196139 Oct. 1994.

*Primary Examiner*—Stephen Kalafut
*Assistant Examiner*—Carol Chaney
*Attorney, Agent, or Firm*—Panitch Schwarze Jacobs & Nadel, P.C.

[57] ABSTRACT

In a safety device for an enclosed cell, a closure anti-explosion valve 1 of a flat metal sheet which is deformable upon a pressure rise inside the cell has a valve body dent 9 formed in the center and protruding toward an inner cover 3, the surrounding wall of the dent 9 is partly reduced in thickness to form a thin-walled portion 1a around the dent, and the dent portion is joined to the inner cover 3 having gas inlet holes 3a at a weld 1c. Preferably, the surface of the closure anti-explosion valve 1 has a plurality of valve body thin-walled portions 1b radially extending from the dent 9. Also preferably, nicks 8 are formed on the upper or under side of the flat sheet part of the closure anti-explosion valve, among the valve body thin-walled portions 1b.

5 Claims, 6 Drawing Sheets

SAFETY DEVICE FOR ENCLOSED CELL

BACKGROUND OF THE INVENTION

This invention relates to an enclosed cell having gas-releasing and current cut-off functions.

Secondary cells such as lithium ion cells have recently come into extensive use for audiovisual, portable, and other appliances and instruments. When such an enclosed cell is overcharged or used wrongly, short circuit can result. Should it happen, a large current flow would decompose the electrolyte in the cell to evolve a gas.

The gas evolution will increase the pressure inside the cell abruptly, and a pressure rise beyond the design resistance of the housing can destroy the cell.

To preclude this trouble, a number of proposals have hitherto been made for cells provided with various safety means.

A concrete example is the disclosure made in the printed publication of Japanese Patent Application Kokai No. 5-343043. It teaches an enclosed cell with a current cut-off function, the structure of which is shown in FIG. 7 as a prior art.

A generating element 12 is contained in an outer case 13, and a positive-pole lead 7 from the generating element 12 is connected to a metal sheet 20, which in turn is bonded to a disk 19.

The disk 19 is held in place by a disk holder 18, which is fitted in a metallic safety valve 17.

A closure assembly comprises a cap and the safety valve 17 gastightly fixed together through an insulating ring gasket 4 in the upper space of the outer case 13. The bottom of a downward dent 16 of the safety device 17 is welded to a P3 portion of the metal sheet 20 to form a welded joint P3 so as to secure the electric continuity on the positive pole side.

Current flow is interrupted in the following way. In case of an abnormality such as overcharge or external shorting, the electrolyte in the cell decomposes with evolution of a gas. When this occurs, the gas is admitted into vent holes 15 to force the safety valve 17 upwardly. As the force lifting the valve 17 increases beyond the bonding force of the joint P3 between the downward dent 16 of the valve 17 and the metal sheet 20, the joint breaks to set the valve 17 and the sheet 20 apart. As a consequence, the safety valve 17 bulges like a dome to cut off the current and bring the gas evolution to a stop.

Another example of the prior art is given in Patent Application Kokai No. 6-196140. In the example, illustrated in FIG. 8, a saucer-like rigid metal sheet 27 is used in place of the metal sheet 20 in the preceding example. A lead wire 25 having a cut 25a that functions like the downward dent 16 of the former example is used to connect the rigid metal sheet 27 and a metallic safety valve 17. Upon gas evolution due to electrolyte decomposition, the safety valve is domed upward to break the thin-walled portion of the lead wire and cut off the current. As means for releasing the gas, the safety valve 17 is made up of a perforated sheet covered with a thin metallic layer, so that in case of the emergency the valve can be partly broken for gas escape.

Still another example is furnished by Patent Application Kokai No. 6-196139. As FIG. 9 shows, a safety valve 17 of metal sheet has a bowl-like recess and its bottom portion is welded to a flat metal sheet 20 with a circular nick 29 formed in the safety valve 17, around the welded joint P. In case of gas evolution, the gas pressure breaks the safety valve 17 at the circular nick 29 to stop the current flow and, at the same time, vent the gas through the resulting hole.

The current cut-off and gas-releasing means of the prior art present problems as follows.

In the exemplary arrangement of FIG. 7, the strength of the weld between the safety valve 17 and the metal sheet 20 governs the cell pressure that cuts off the current.

Any variation in the weld strength will cause a corresponding variation in the cell pressure to interrupt the current. In extreme cases the pressure inside the cell can soar to a dangerous degree.

The present invention has for its object to prevent such a danger in case of a pressure rise in the cell by effecting a rapid current cut-off regardless of any variation in the weld strength and by simpler opening of a closure anti-explosion valve to release the gas evolved inside.

The prior art arrangement of FIG. 8 involves difficulties in assembling, because the lead wire 25 having a cut 25a must be welded at one end to the saucer-like sheet 27 and at the other end to the underside of the safety valve 17. Moreover, the arrangement requires an additional member since, for the release of gas, it depends on the break of another sheet that constitutes a part of the safety valve 17.

It is another object of the present invention to eliminate the need of the intricate member and hence of the complex assembling operation.

In the arrangement of FIG. 9, the safety valve 17 has a bowl-like recess, and an abnormal boost of gas pressure breaks the valve at its circular nick 29, causing the valve to dome around the resulting hole to stop the current flow and, at the same time, vent the gas through the hole. However, because the safety valve 17 is generally in the form of a bowl, it offers a considerable resistance to the lifting force of the gas pressure. Once opened at the circular nick, it is no longer lifted because the pressure dwindles. This can bring the safety valve 17 and the metal sheet 20 into contact again, and hence the possibility of resumed current flow. In this respect the cited arrangement fails to provide perfect safety.

It is a further object of the invention to preclude the resumption of current flow.

SUMMARY OF THE INVENTION

The present invention is briefly outlined below with reference to FIG. 1 for a better understanding. In the safety device of an enclosed cell shown, a closure anti-explosion valve 1 of a flat metal sheet which is deformable upon a pressure rise inside the cell has a valve body dent 9 formed in the center to protrude toward an inner cover 3. The valve body dent 9 is surrounded with a thin-walled portion 1a and is joined at a weld 1c to the inner cover 3 having gas inlet holes 3a.

Preferably, the closure anti-explosion valve 1 has on its surface a plurality of valve body thin-walled portions 1b reduced in wall thickness and extended radially from the valve body dent 9 in the center.

More preferably, the flat sheet part of the closure anti-explosion valve 1 is formed with nicks 8 by nicking on the upper or under side, among the thin-walled portions 1b.

In another aspect, the present invention includes a cap 2 and provides a PTC element between the cap 2 and the closure anti-explosion valve 1 so as to impede the current upon an abnormal temperature rise. This arrangement may be used in combination with other safety means.

The construction according to the present invention permits deformation of the closure anti-explosion valve 1 toward the cap 2 upon a pressure rise inside the cell. When the internal pressure has reached a predetermined level, the thin-walled portion 1a around the valve body dent 9 of the closure anti-explosion valve 1 breaks, interrupting current flow. Starting with a small hole 11 in the center of the valve 1 that has resulted from the break of the thin-walled portion 1a, tearing of the valve body thin-walled portions 1b progresses, forcing them wide open to release the gas that has evolved inside the cell to the outside. The closure anti-explosion valve 1 that has been deformed toward the cap 2 by the valve body thin-walled portions 1b forced open is turned up at the nicks 8. Thus there is no possibility of the closure anti-explosion valve that has been deformed toward the cap 2 after the gas release being brought down into contact with the inner cover 3 to resume current flow.

Thanks to this operation, when the pressure inside the cell has boosted, the current cut-off mechanism of the closure anti-explosion valve 1 cuts off the current quickly to stop the reaction in the cell. The gas that is already present in the cell can be instantly discharged, depending on the state of gas evolution, by tearing open the valve body thin-walled portions 1b following the making of a small hole 11 in the center of the closure anti-explosion valve 1.

When a PTC element is employed, an excessive current that may result, e.g., from shorting of the load and that raises the temperature can be impeded because the element provides a rapidly increasing resistance if a given critical temperature is surpassed.

These actions in accordance with the present invention combinedly protect the cell against any danger when its overcharge or external shorting has resulted from the misuse or trouble of any appliance or instrument using the cell.

DESCRIPTION OF THE PREFERRED EMBODIMENTS

First embodiment

Figure 1:
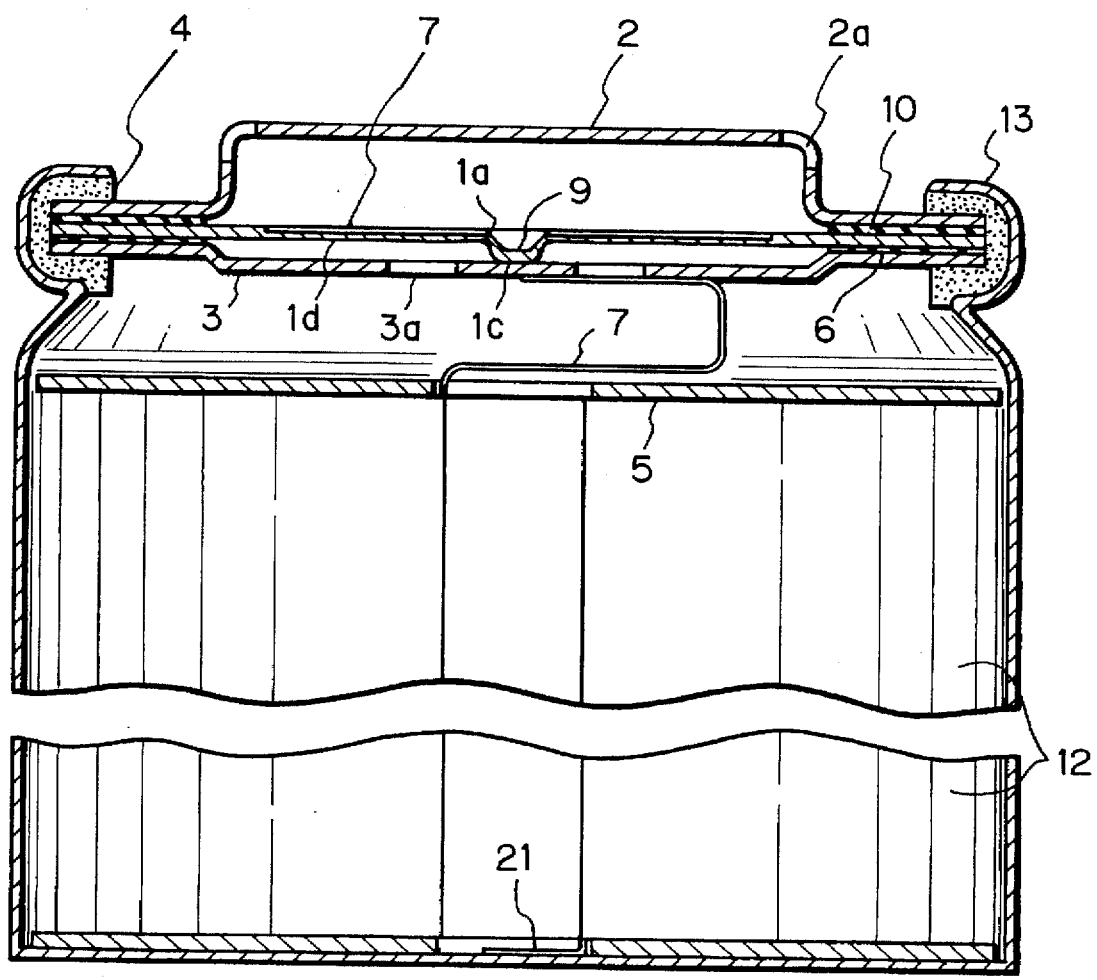
FIG. 1 is a diagrammatic sectional view of an enclosed cell equipped with a closure anti-explosion valve as an embodiment of the invention.

FIG. 1 shows a preferred embodiment of the present invention. The embodiment comprises an electrically conductive outer case holding a generating element 12 which has positive and negative poles, a positive-pole lead 7 being extended from the element 12. The positive-pole lead 7 extends through a center hole of an insulator sheet 5 and is welded at its outer end to a conductive inner cover 3. A negative-pole lead 21 from the generating element 12 is welded to the inner bottom of the outer case 13 that provides an external terminal on the negative pole side.

A closure assembly comprises a conductive closure anti-explosion valve 1 in the form of a generally flat sheet with a recess or dent 9, a cap 2 that provides an external terminal on the positive pole side, an inner cover 3, and means for integrally supporting these members by combining their peripheries altogether. A PTC element 10 that offers a rapidly increased resistance when the temperature rises above a predetermined temperature is located under the periphery of the cap 2. The closure anti-explosion valve 1 is thus sandwiched along its periphery between the PTC element 10 and an insulating ring 6. The peripheries of these members are wrapped together by an insulating gasket 4, and the upper end portion of the outer case 13 is crimped over the wrap to establish gastight enclosure. While the PTC element 10 is used in the present embodiment, it may be omitted and replaced by a direct combination of the closure anti-explosion valve 1 and the cap 2. The use of a PTC element protects the cell in the case of a temperature rise of the cell or the element itself with a rapid increase in current due to short-circuiting of a load circuit or other trouble; in such a case the element develops a strong enough resistance to control the current. At ordinary service temperatures its resistance is so low that, as long as it has a sufficient area, the element does not interrupt usual current flow.

The closure anti-explosion valve 1 consists of a valve body dent 9 in the center and a flat sheet part around the dent. The valve body dent 9 has a thin-walled portion 1a formed along its periphery and in the boundary between itself and the flat sheet part. The thickness of this thin-walled portion 1a is so chosen that the portion breaks when the pressure inside the cell exceeds a predetermined level.

Figure 2:
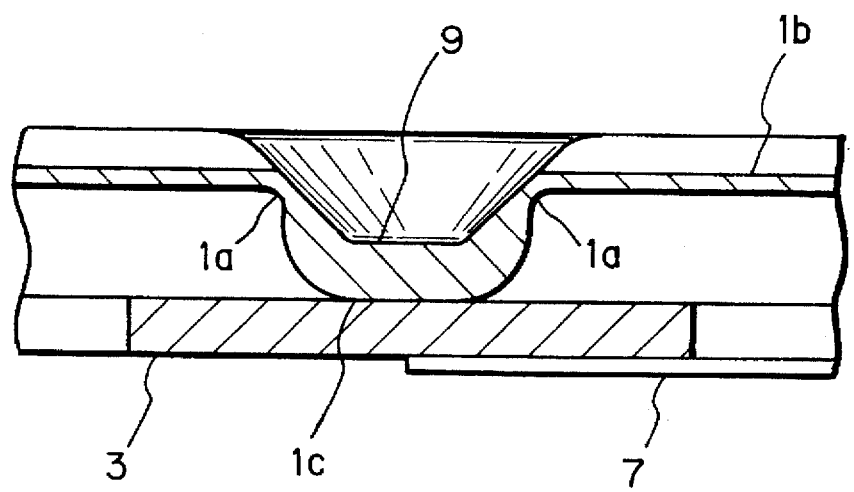
FIG. 2 is an enlarged sectional view of a valve body dent, with its welded joint, of the closure anti-explosion valve shown in FIG. 1.
Figure 3:
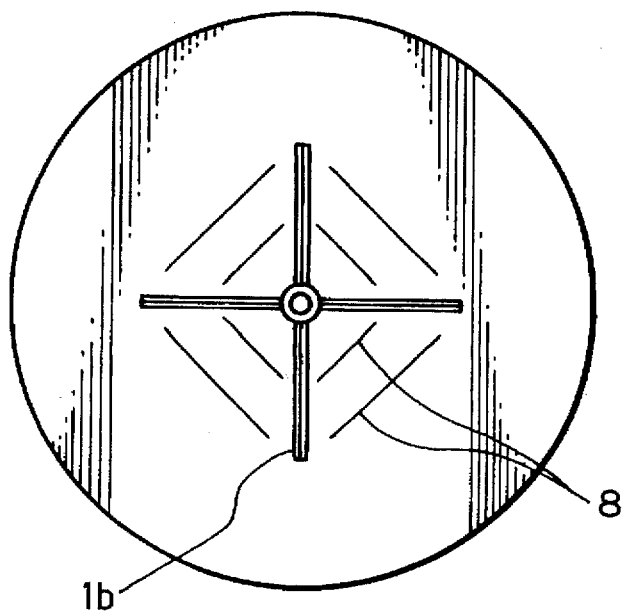
FIG. 3 is a partial plan view of the closure anti-explosion valve of FIG. 1.

As FIGS. 2 and 3 indicate, the flat sheet part of the closure anti-explosion valve 1 is formed, on its surface, with a plurality of radially extending thin-walled portions 1b of the valve body that start from the valve body dent 9.

It should be noted that the anti-rupture strength of the thin-walled portion 1a is so selected to be lower than that of the radially extending thin-walled portions 1b so that the portion 1a is first broked when a pressure exceeds a critical point of pressure and that the welding strength of the weld 1c is so selected to be larger than the anti-rupture strength of the thin-walled portion 1a.

In addition, a plurality of nicks 8 are formed between the adjacent thin-walled portions 1b of the valve body.

As for the material of the closure anti-explosion valve 1, aluminum or other similar metal is suited because of ease of press working, inertness to the attack of the gas evolved or the electrolyte in the cell, and impermeability to moisture. The closure anti-explosion valve 1 can be fabricated from such a metal sheet by drawing on a press.

The valve body dent 9 of the closure anti-explosion valve 1 is in face-to-face contact with the inner cover that has gas inlet holes 3a, and the two are solidly welded in that contact area. Electric welding, supersonic welding, or other welding technique which produces a solid weld may be used without hindrance.

The smaller the diameter of the thin-walled portion 1a of the valve body dent 9, the more stably at low pressures the closure anti-explosion valve 1 operates. Thus the diameter should be as small as possible. For example, a diameter of about 3 mm or less is desirable.

Second embodiment

Figure 6:
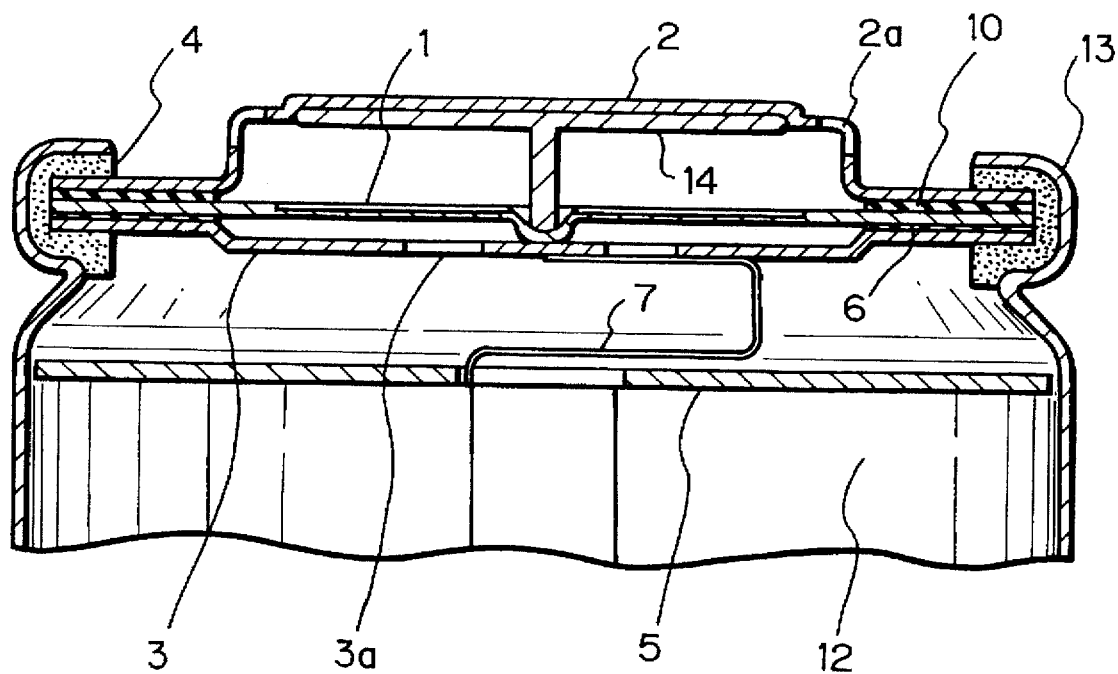
FIG. 6 is a diagrammatic sectional view of an enclosed cell equipped with a stoppered closure anti-explosion valve as another embodiment of the invention.
Figure 7:
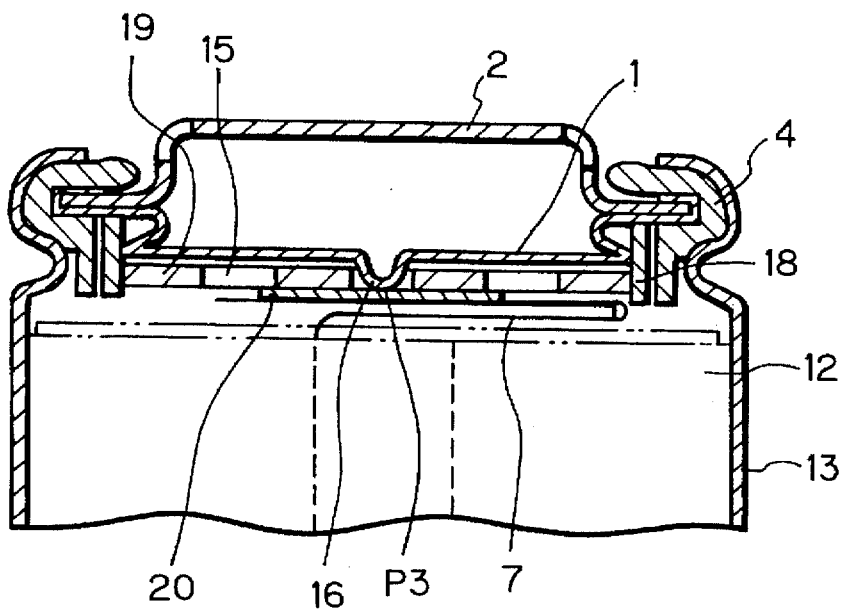
FIG. 7 is a sectional view of a conventional enclosed cell.
Figure 8:
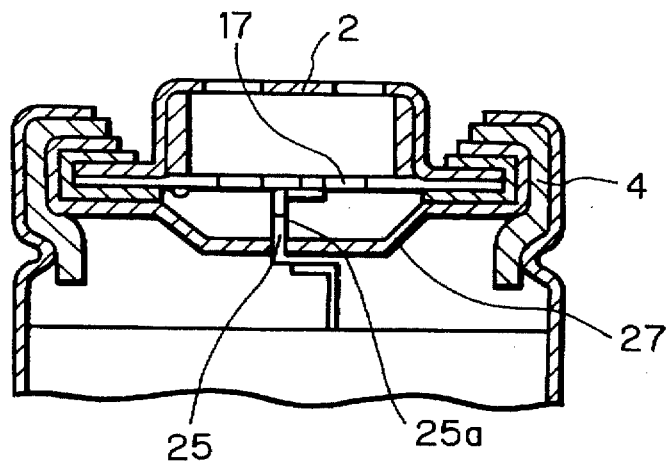
FIG. 8 is a sectional view of another conventional enclosed cell.
Figure 9:
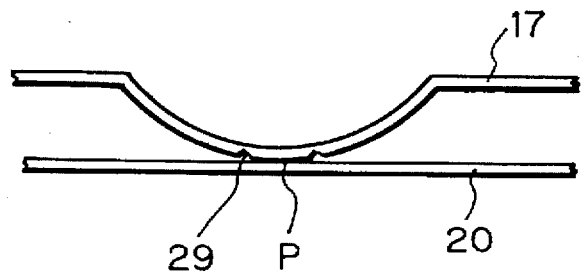
FIG. 9 is a fragmentary sectional view of still another enclosed cell of the prior art.

FIG. 6 shows another embodiment of the invention. Parts like those in FIG. 1 are designated by like numerals, with omission of description. In the embodiment shown, a disk-shaped part of a stopper 14 formed from a metal or non-conductive material insulated on the surface is located immediately below a cap 2, and the lower end of a stopper bar vertically extending from the center of the disk is pressed fixedly against the bottom of the dent of a valve body dent 9 of a closure anti-explosion valve 1. Thus, unlike the counterparts of the first embodiment, the valve body dent 9 of the closure anti-explosion valve 1 and the inner cover 3 need not be solidly welded together.

Modifications

Figure 5A:
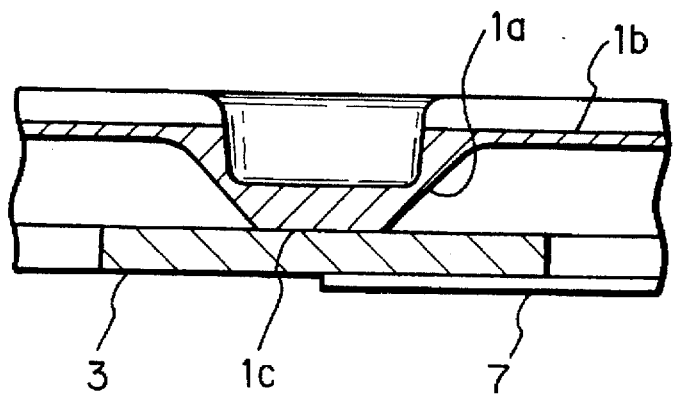
FIG. 5 shows modifications of the valve body bulge.
Figure 5B:
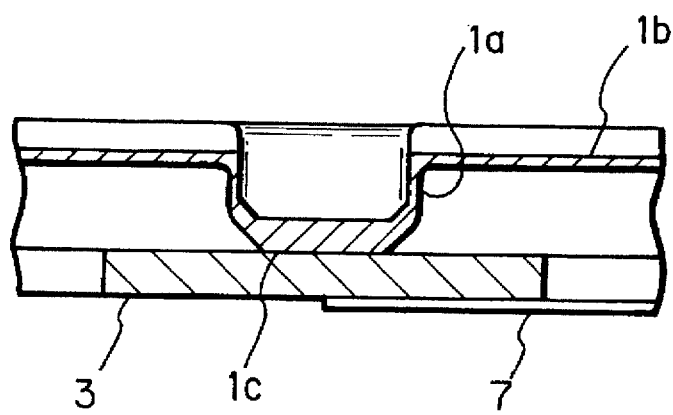
Figure 5C:
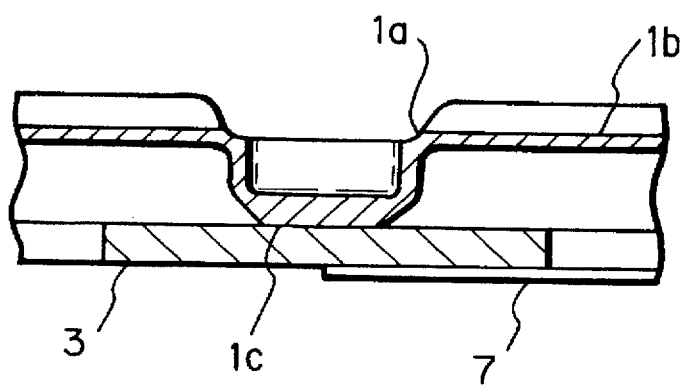

FIG. 5 illustrates various modifications of the valve body dents 9 of the preceding embodiments. At (a), the upper side of a valve body dent is formed by drawing to the shape of a cylindrical recess while the under side is drawn to an inverted truncated cone. As a consequence a thin-walled portion 1a is circumferentially formed at an intermediate height along the outer wall of the valve body dent 9.

At (b), a valve body dent is formed substantially in the form of a cylinder both inside and outside and a thin-walled portion 1a is formed as a surrounding wall of the dent contiguous to a flat sheet part of the valve.

At (c), a valve body dent is cylindrically formed inside and outside to provide a thick surrounding wall. The surrounding wall is formed as depressed downward to provide a thin-walled portion 1a only along the boundary between the surrounding wall of the valve body dent 9 and the flat sheet part.

Figure 4A:
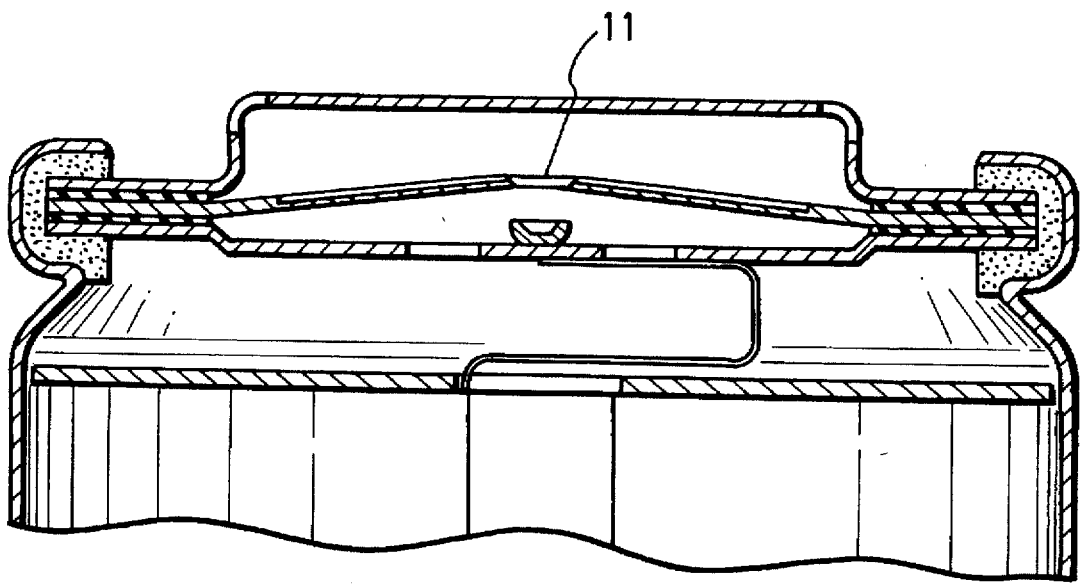
FIG. 4 illustrates the closure anti-explosion valve of FIG. 1 in action; with its thin-walled portions 1a broken and the flat sheet part of the valve lifted (a), and the thin-walled portions 1b broken and the flat sheet part further lifted (b)

The operation of the cells embodying the invention will now be described. When the pressure inside a cell of such a structure has increased for some reason or other, the gas evolving in the cell passes through the gas inlet holes 3a of the inner cover 3, forcing the pressure-receiving side 1d of the closure anti-explosion valve 1 upward against the cap 2. At the point where the pressure lifting the pressure-receiving side 1d of the closure anti-explosion valve 1 has reached a predetermined value, the valve 1 breaks at the thin-walled portion 1a. Then, as shown in FIG. 4(a), the flat sheet part of the closure anti-explosion valve 1 is pushed up and deformed while leaving the valve body dent 9 behind on the inner cover 3. This breaks the conductive continuity between the closure anti-explosion valve 1 and the inner cover 3 and stops current flow.

The stability in operation of the closure anti-explosion valve 1 at low pressures is increased in reverse proportion to the diameter of the thin-walled portion 1a of the valve dent.

Figure 4B:
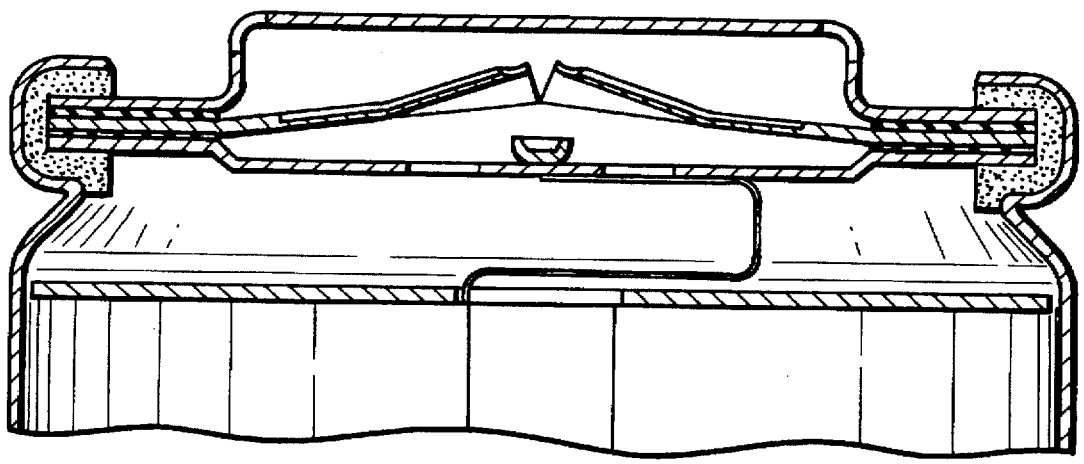

The gas that has already evolved in the cell is released through the small hole 11 formed by the action of the closure anti-explosion valve 1. At the same time, the gas tears the valve body thin-walled portions 1b open, radially from the hole 11 thus formed. The condition at this stage is shown in FIG. 4(b). In this manner the gas that has evolved in the cell is discharged to the outside by way of vents 2a in the cap 2.

The closure anti-explosion valve 1 having been forced open, the flat sheet part is turned up at the nicks 8, so that after the release of the gas from the cell the broken portion of the closure anti-explosion valve 1 is kept from turning down against the inner cover 3, thus precluding the resumption of current flow.

The present invention thus permits current cut-off regardless of the weld strength of the joint between the closure anti-explosion valve and the inner cover, and allows the valve to be opened readily when needed.

Under the invention, a pressure increase inside the cell breaks the closure anti-explosion valve at the thin-walled portion provided around the valve body dent to stop current flow. Starting with a small hole formed in the center of the closure anti-explosion valve by the broken thin-walled portion, other valve body thin-walled portions are torn open to release the gas that has evolved in the cell to the outside. The valve has nicks at which it can turn up, causing its flat sheet part to deform toward the cap after the gas release, thereby preventing the valve from descending into contact with the inner cap for the resumption of current flow. In addition, it is possible in accordance with the invention to form a valve body dent having an exactly specified thin-walled portion around it by drawing. This ensures not only easy and low-cost manufacture but also stability and safety in operation.

What is claimed is:

1. A safety device for an enclosed cell having a cell case with an opening and a generating element located therein, the safety device comprising an electrically conductive inner cover formed with gas inlet holes, said inner cover being located in the opening of the cell case and being electrically connected to the generating element via a positive-pole lead, an outer conductive closure anti-explosion valve located outside of the inner cover which closes the opening in a gas tight manner which is deformable upon a pressure increase inside the cell, said closure anti-explosion valve consisting of a valve body dent located in a center region of the closure anti-explosion valve and protruding toward the inner cover and a flat sheet part having a generally uniform thickness which extends around the dent, with a thin-walled portion having a thickness which is less than said uniform flat sheet thickness formed between the dent and said flat sheet part, said dent being joined to the inner cover with a weld, said flat sheet part including a plurality of valve body thin-walled portions, each having a thickness which is less than said thickness of the flat sheet part, the valve body thin-walled portions being formed on a surface of the flat sheet part and extending radially from the valve body dent.

2. A safety device according to claim 1 wherein nicks are formed on at least one surface of the flat sheet part, between adjacent radially extending valve body thin-walled portions on the flat sheet part.

3. A safety device according to claim 1 wherein said closure anti-explosion valve is connected along a periphery thereof with a conductive cap through a positive temperature coefficient element.

4. An enclosed cell having a safety device comprising a cell case with an opening and a generating element located therein, an electrically conductive inner cover formed with gas inlet holes, said inner cover being located in the opening of the cell case and being electrically connected to the generating element via a positive-pole lead, an outer conductive closure anti-explosion valve which closes the opening in a gas tight manner which is deformable upon a pressure increase inside the cell, said closure anti-explosion valve consisting of a valve body dent formed in a center region of the closure anti-explosion valve and protruding toward the inner cover and a flat sheet part having a generally uniform thickness extending around the dent, with a thin-walled portion having a thickness which is less than said generally uniform thickness formed between the dent and said flat sheet part, said dent being joined to the inner cover with a weld, said flat sheet part having a plurality of valve body thin-walled portions having a thickness which is less than said generally uniform thickness of the flat sheet part formed on a surface thereof and extending radially from the valve body dent.

5. An enclosed cell according to claim 4 wherein nicks are formed on at least one surface of the flat sheet part between adjacent radially extending valve body thin-walled portions on the flat sheet surface.

* * * * *